US006246047B1

(12) United States Patent
Mikan

(10) Patent No.: US 6,246,047 B1
(45) Date of Patent: Jun. 12, 2001

(54) FIBER OPTIC CONTROL WITH JOY STICK

(76) Inventor: Peter J. Mikan, 31 Greenfield Rd., Milford, CT (US) 06460

( * ) Notice: Subject to any disclaimer, the term of this patent is extended or adjusted under 35 U.S.C. 154(b) by 0 days.

(21) Appl. No.: 09/251,780

(22) Filed: Feb. 17, 1999

(51) Int. Cl.[7] ..................................................... G06F 3/033

(52) U.S. Cl. ............................................ 250/221; 345/161

(58) Field of Search ............................ 250/221; 345/158, 345/161, 166, 167

(56) References Cited

U.S. PATENT DOCUMENTS 4,459,022 * 7/1984 Morey ................................. 250/221

FOREIGN PATENT DOCUMENTS 10-21003 * 1/1998 (JP) .

* cited by examiner

*Primary Examiner*—F. L. Evans
(74) *Attorney, Agent, or Firm*—OURPAL® Asija; Gibner Lehman

(57) ABSTRACT

A fiber optic control device has a joy stick and fixed thereon a unique pivot ball to enable the stick to have a universal pivotal movement. The pivot ball has relatively large surface portions of poor light-reflecting properties, and other surface portions which have good light-reflecting properties. This assemblage is carried by a base structure which provides a socket for the pivot ball, and cooperable movement-limiting means are on the pivot ball and socket, that enable such universal pivotal movement of the joy stick and ball to be had while still preventing rotative movement of the stick and ball about the longitudinal axis thereof. A unique fiber-optic light transmission means including a source of light which is adapted to direct a light beam against portions of said ball surface is provided, such means providing output light signals which are a function of the virtual position of said ball as effected by movements of said joy stick.

10 Claims, 2 Drawing Sheets

FIBER OPTIC CONTROL WITH JOY STICK

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

FIELD OF THE INVENTION

This invention relates generally to joystick devices of the kind having a swivel mounted manually-engageable lever capable of movement from a center position to any one of a number of angular positions lying within a theoretical upwardly-extending conical surface, for controlling the operation of various types of electronic or electromechanical equipment.

DESCRIPTION OF THE RELATED ART INCLUDING INFORMATION DISCLOSED UNDER 37 CFR §§1.97–1.99

The following references are hereby cited as being representative of some of the known prior art in the field to which the present invention pertains:

U.S. Pat. Nos.:

4,459,022 4,731,530

U.S. Pat. No. 4,459,022 discloses a fiber optic angular sensor wherein a mirror is carried by a joystick so as to have universal movement as the joystick is manipulated. An optical cable having five fibers is brought to cooperate with the mirror. One cable directs a light beam against the mirror to be reflected thereby, and the remaining four cables pick up reflected light from the mirror and carry the same to a light responsive control, from which functions are obtained to operate various pieces of equipment.

In U.S. Pat. No. 4,731,530 a joystick operates sector members which have a varied transparency. Light beams are directed against the sectors and pass through the same with varying degrees of intensity, in the manner of a filter. These filtered beams are utilized by means of electronic circuitry to effect control functions for operating different pieces of equipment.

While the foregoing patents disclose fiber optic cables in connection with joystick controls, the junctures where the cables were connected were shown as mostly diagrammatic in nature, with specific details largely omitted, and in practice such showings left much to be desired.

The shortcomings in the prior art where the primary actuator is to join with the fiber optic cables are obviated by the present invention, and one object of the invention is to provide an improved and simplified juncture means between cable ends on the one hand and the primary actuator on the other hand.

Another object of the invention is to provide an improved fiber optic control device of the type having cables and a joystick, which is especially simple in its construction and economical to fabricate.

A further object of the invention is to provide an improved fiber optic/joystick control as above set forth, wherein the number of moving parts is reduced to an absolute minimum, thereby reducing manufacturing cost, simplifying assembly, and improving reliability.

Other features and advantages will hereinafter appear.

In accomplishing the above objects the invention provides a joystick control comprising, in combination a joystick having fixed thereon a unique pivot ball which not only enables the stick to have a universal pivotal movement, but which also constitutes the primary mover of the control. This unique pivot ball has relatively large surface portions of poor light-reflecting properties and other surface portions of good light reflecting properties. A base that provides a socket for the pivot ball is provided, together with cooperable movement-limiting means on the ball and socket, that enable the required pivotal movement to be had while at the same time preventing relative rotative movement of the joy stick and ball about the longitudinal axis thereof. The invention provides fiber optic light transmission means which are cooperable with the various surface portions of the pivot ball, such means including a source of light adapted to direct a light beam against various portions of the ball surface. Reflections of light from said surfaces provide output light signals which are a function of the virtual position of the ball as effected by the movements of the joy stick. Unique light-coupling means in the form of complementary light-transmitting blocks are provided with bores that receive the ends of the fiber optic cables, such blocks as assembled being received in large bores of the base member and having concave surfaces in which portions of the pivot ball are closely fitted.

Figure 1:
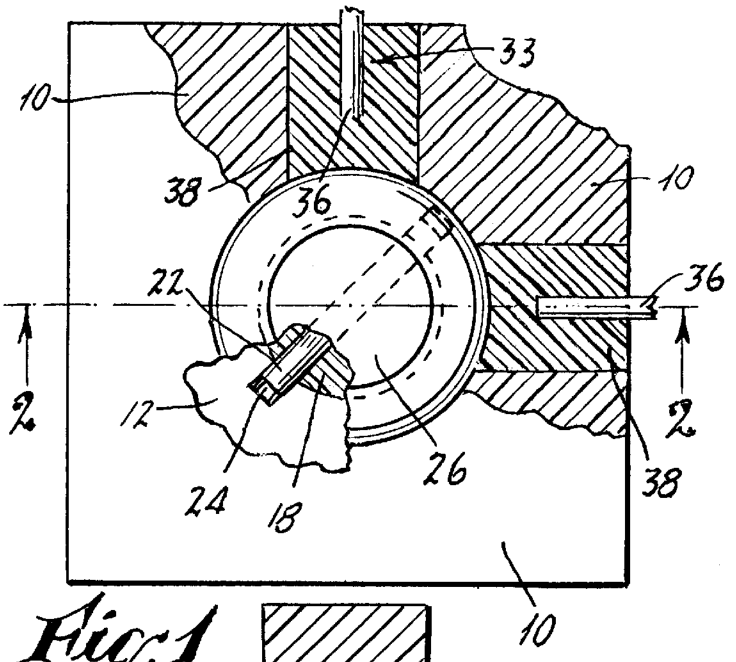
FIG. 1 is a top plan view of the fiber optic control device of the invention, with portions shown in section taken on the line 1—1 of FIG. 2.
Figure 2:
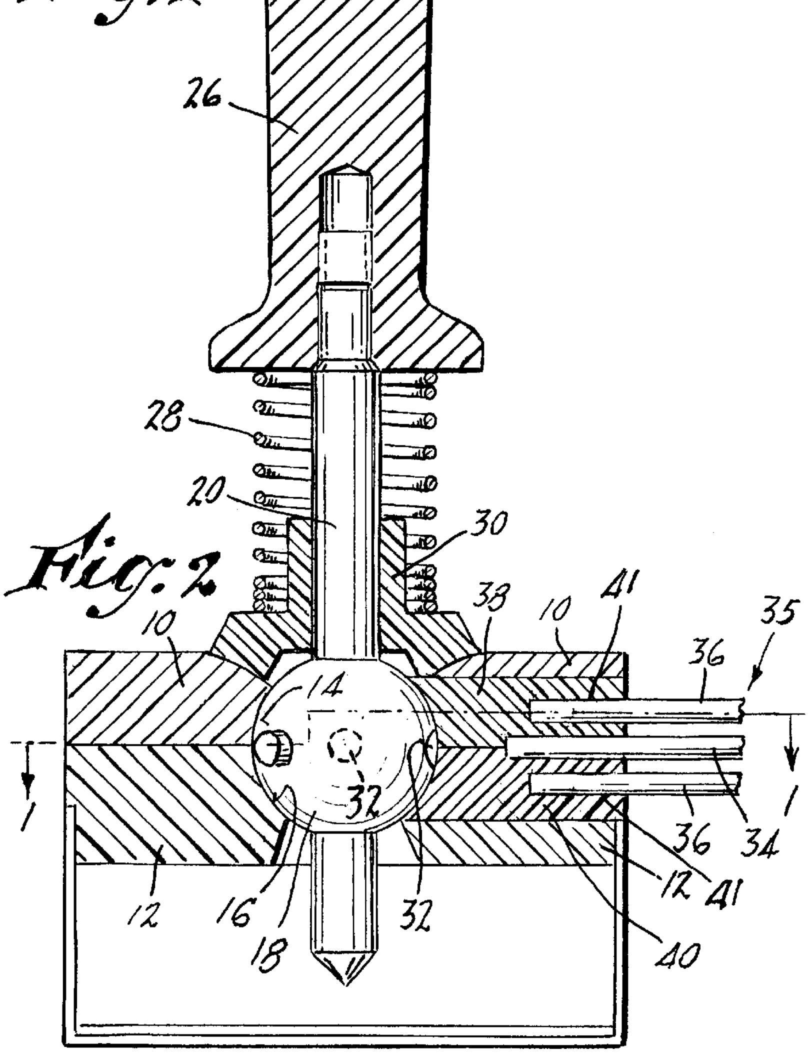
FIG. 2 is an axial vertical section of the control device, taken on the line 2—2 of FIG. 1.
Figure 4:
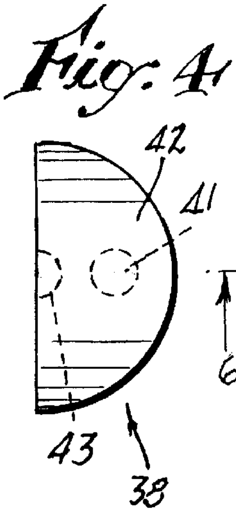
FIG. 4 is a left end elevation of the transparent block of FIG. 3.
Figure 3:
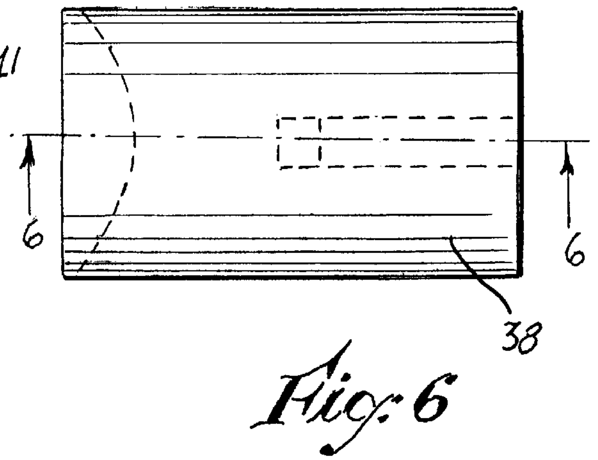
FIG. 3 is a top plan view of one of the two identical transparent light coupling blocks by which the fiber optic cables are coupled to the joystick assemblage.
Figure 5:
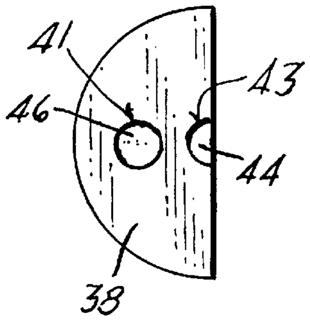
FIG. 5 is a right end elevation of the transparent block of FIG. 3.
Figure 6:
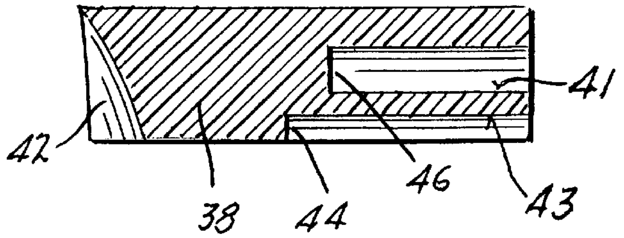
FIG. 6 is a longitudinal section of the transparent block of FIG. 3, taken on the line 6—6 thereof.
Figure 7:
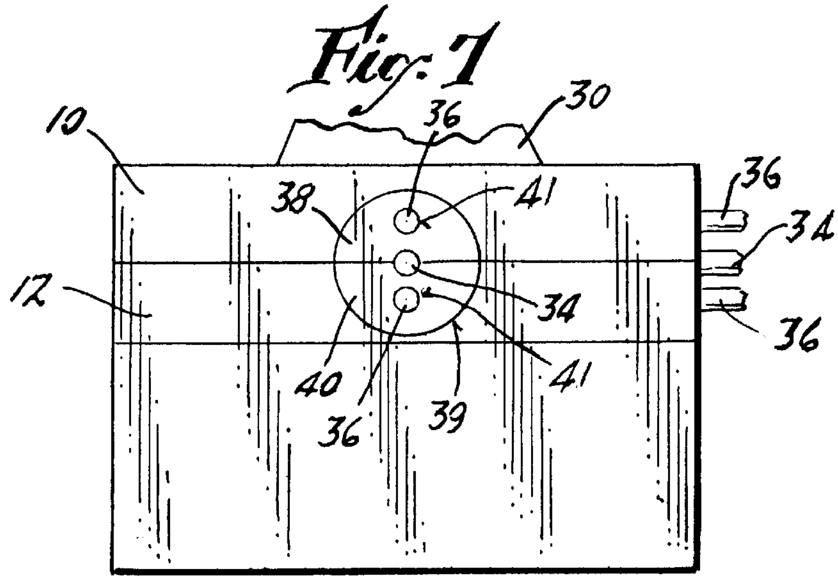
FIG. 7 is a right side elevational view of the control, with upper portions of the joy stick broken away.

Referring first to FIGS. 1 and 2, the improved fiber optic joystick control of the invention is shown as comprising a base structure in the form of upper and lower bearing or mounting members 10 and 12 respectively, having hemispherical bearing sockets 14 and 16 respectively, in which is received a ball pivot 18 carried by a joystick shaft 20. By such arrangement the joystick can have limited universal movement as is usual.

The joystick 20 is prevented from having turning movement about its axis by a transverse control pin 22 which passes through the center of the ball 18 and terminates at its ends in pairs of aligned vertical slots 24 of the bearing members 10 and 12, as is usual in constructions of the present kind. Further details of the pin 22 and slots 24 are not given herein since they are well known in the art and per se form no part of the present invention.

The joystick 20 has an operating knob or handle 26 and is encompassed by a compression spring 28 bearing against a centralizing collar 30 which is cooperable with a dished spherical portion of the upper bearing member 10, all in the usual manner.

In accordance with this invention, the ball 18 is unique in that it has relatively large surface portions of poor light reflecting properties, and other surface portions of good light reflecting properties, all of said portions being cooperable with fiber optic light transmission means that are adapted to transmit light to the ball 18 and to receive reflected light from the ball so as to produce useful output light signals which are a function of the position of the ball in the bearing members 10 and 12. In consequence, the position of the joystick 20 which controls the positioning of the ball 18, is capable of producing useful light signals.

Referring to FIG. 2, the ball 18 can have two good light reflective surface portions 32 configured, for example, as circular reflective spots, and the remainder of the ball can be black or have similar poor light reflective surface portions.

For cooperation with such ball, the invention provides two sets of fiber optic cable assemblages 33 and 35 each having an individual fiber optic cable 34 which is connected to a source of light (not shown), and each having two other individual signal carrying fiber optic cables 36 which are adapted to carry reflected light signals from the ball 18 to electronic receivers (not shown) which can be used for horizontal and vertical control and/or other purposes.

The cable sets 33 and 35, in accordance with the invention, are brought into paired or complementary identical upper and lower light coupling fittings or blocks 38 and 40 which have bores 41 and grooves 43 to receive the ends of the cables 34 and 36 of the sets. The blocks 38 and 40 when so paired are carried in large bores 39 formed between the upper and lower bearing members 10 and 12. One such light coupling fitting or block is illustrated in FIGS. 3–6.

Almost all of the surfaces of the fittings 38, 40 are coated as by vapor deposition so as to reflect light which strikes them, and to bar to the greatest possible extent the passage of light through them, except for those surfaces designated 42, 44 and 46. Thus the fittings act as light "pipes" in a sense, that are "insulated" from each other with respect to the passage of light rays.

Two surfaces 42 of each set of fittings combine to form a spherical socket for outer portions of the ball 18, as can be understood from an inspection of FIG. 2. Of all of the other six surfaces 44, 46 which are not vapor coated, four cooperate respectively (numbers 46) with four signal carrying fiber optic cables 36 and two numbered 44 provide light to the ball. The four uncoated surfaces 46 can receive reflected light from the ball, specifically from the light-reflecting spots 32 thereon. Such received light will be reflected inside of the vapor coated bores 41 of the blocks 38 and 40 and be received by the fiber optic cables 36. The vapor deposition on the side walls of the bores 41 and grooves 43 provides a coating which is highly reflective or mirror-like while at the same time allowing a minimum amount of light to pass through the walls and into the block from said walls.

With the above arrangement, in accordance with the invention, when the joy stick 20 is in the vertical or neutral position, the reflective spots 32 will reflect equal quantities or strengths of light beams into each of the respective upper and lower fiber optic cables 36, so that the signals carried thereby will be equal and neutralizing, thereby to prevent operation of the controlled equipment in either of its opposite modes or directions, this being true for both sets 33, 35 of the cable assemblies governing right-left and up-down movements.

It will now be seen that I have provided an improved fiber optic control device of the type using a joy stick, which is extremely simple, requiring a minimum number of parts, is low in cost, easy to assemble and reliable in its operation. The device replaces more costly assemblies of fiber optic cables and joysticks, and has features that are not found in more costly devices.

Variations and modifications are possible within the scope of the appended claims, without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

Reference Characters

10. Mounting member
12. Mounting member
14. Bearing socket
16. Bearing socket
18. Pivot ball
20. Joystick shaft
22. Control pin
24. Vertical slot
26. Handle
28. Compression spring
30. Centralizing collar
32. Good light reflecting surface
33. Set or assemblage of fiber optic cables
34. Fiber optic cable
35. Set or assemblage of fiber optic cables
36. Fiber optic cable
38. Coupling fitting or block
40. Coupling fitting or block
42. Designated surface
44. Designated surface
46. Designated surface

What is claimed is:

1. A fiber optic control device comprising, in combination:

a) a joy stick having fixed thereon a pivot ball to enable the stick to have a universal pivotal movement;

b) said pivot ball having relatively large surface portions of poor light-reflecting properties;

c) other surface portions of said ball having good light-reflecting properties;

d) means providing a socket for said pivot ball;

e) cooperable movement-limiting means on said pivot ball and socket, enabling said universal pivotal movement of the joy stick and pivot ball to be had while preventing rotative movement of the joy stick and pivot ball about the longitudinal axis thereof;

f) fiber-optic light transmission means cooperable with said surface portions of the pivot ball and including a source of light adapted to direct a light beam against portions of said ball surface, for providing output light signals which are a function of the virtual position of said ball as effected by movements of said joy stick;

g) said light transmission means includes light coupling means for receiving fiber optic cables;

h) said light coupling means comprising a pair of each semi-cylindrical cooperable blocks having faces which together form a concave surface in which a portion of the said pivot ball is received; and i) said blocks having flat faces which are engaged with each other whereby the blocks constitute a composite cylindrical configuration.

2. A fiber-optic control device as set forth in claim 1 wherein the means which provides a socket for the ball has a bore in which the said blocks are carried.

3. A fiber-optic control device as set forth in claim 1 wherein:

a) said blocks each have a bore to receive the end portion of a fiber optic cable, and have a groove in the flat face thereof; and b) said grooves cooperating with each other to form an additional bore for receiving the end portion of another fiber optic cable.

4. A fiber-optic control device as set forth in claim 3, wherein the side walls of the bores of the blocks are coated by vapor deposition so as to be highly reflective and also prevent passage of light there through.

5. A fiber-optic control device as set forth in claim 1, wherein the blocks are identical with each other and have mating, co engaging flat faces.

6. A fiber-optic control device as set forth in claim 5, wherein the flat faces of the blocks are coated by vapor deposition so as to be highly reflective and also prevent passage of light there through.

7. A fiber-optic control device as set forth in claim 5, wherein the light coupling means has a transparent surface which is in engagement with said pivot ball.

8. A fiber-optic control device as set forth in claim 3, wherein the groove is longer than the depth of the bore in the block.

9. A fiber optic control device comprising, in combination:

a) a joy stick having fixed thereon a pivot ball to enable the stick to have a universal pivotal movement;

b) said pivot ball having relatively large surface portions of poor light-reflecting properties;

c) other surface portions of said ball having good light-reflecting properties;

d) means providing a socket for said pivot ball;

e) cooperable movement-limiting means on said pivot ball and socket, enabling said universal pivotal movement of the joy stick and pivot ball to be had while preventing rotative movement of the joy stick and pivot ball about the longitudinal axis thereof;

f) fiber-optic light transmission means cooperable with said surface portions of the pivot ball and including a source of light adapted to direct a light beam against portions of said ball surface, for providing output light signals which are a function of the virtual position of said ball as effected by movements of said joy stick;

g) said light transmission means includes two sets of light coupling means for receiving fiber-optic cables;

h) each set of light coupling means comprising a transparent block having bores for receiving fiber-optic cables; and i) said transparent block having a concave surface in which a portion of said pivot ball is received.

10. A fiber optic control device comprising, in combination:

a) a joy stick having fixed thereon a pivot ball to enable the stick to have a universal pivotal movement;

b) said pivot ball having relatively large surface portions of poor light-reflecting properties;

c) other surface portions of said ball having good light-reflecting properties;

d) means providing a socket for said pivot ball;

e) cooperable movement-limiting means on said pivot ball and socket, enabling said universal pivotal movement of the joy stick and pivot ball to be had while preventing rotative movement of the joy stick and pivot ball about the longitudinal axis thereof;

f) fiber-optic light transmission means cooperable with said surface portions of the pivot ball and including a source of light adapted to direct a light beam against portions of said ball surface, for providing output light signals which are a function of the virtual position of said ball as effected by movements of said joy stick;

g) said light transmission means includes assemblages of light coupling means for receiving fiber optic cables; and h) each said light coupling means comprising a pair of cooperable blocks having faces which together form a concave surface in which a portion of said pivot ball is received.

* * * * *